(12) United States Patent
Feiertag

(10) Patent No.: US 6,306,479 B1
(45) Date of Patent: Oct. 23, 2001

(54) KINETIC ART PAPER

(76) Inventor: Alan Feiertag, 48 Percival Ct., Old Bridge, NJ (US) 08857

( * ) Notice: Subject to any disclaimer, the term of this patent is extended or adjusted under 35 U.S.C. 154(b) by 0 days.

(21) Appl. No.: 09/370,479

(22) Filed: Aug. 9, 1999

(51) Int. Cl.$^7$ ........................................................ B32B 3/14
(52) U.S. Cl. ................................ 428/77; 40/415; 40/433; 40/436; 40/502; 40/505; 40/743
(58) Field of Search .................. 428/77; 40/415, 40/433, 436, 502, 505, 743

(56) References Cited

U.S. PATENT DOCUMENTS 3,314,180 * 4/1967 Porter ...................................... 40/160
4,793,666 * 12/1988 Torrence ............................... 312/134

* cited by examiner

Primary Examiner—Harold Pyon
Assistant Examiner—Shalie Manlove
(74) Attorney, Agent, or Firm—Kaplan & Gilman, LLP

(57) ABSTRACT

An art paper designed to facilitate the creation of kinetic art works. The term "kinetic art" refers to paintings or pictures, which have been designed to be shaped in a pleated manner and displayed in 3 dimensions to afford the viewer different images dependant upon the viewer's position in relation to the art. Kinetic art paper consists of a repeated pattern of long vertical strips of equal size separated by channels which define the precise location of where folds should be made to form a uniform pattern of pleats. The channels aid in the folding process. Image information is placed on the vertical strips, either through a manual painting or coloring process or through the use of a computer assisted printing program.

4 Claims, 3 Drawing Sheets

KINETIC ART PAPER

TECHNICAL FIELD

This invention relates to the creation of kinetic art paper.

BACKGROUND OF THE INVENTION

For the purpose of this patent application the term "kinetic art" refers to paintings or pictures, prepared on materials which have been shaped in a pleated manner and displayed in 3 dimensions so as to afford the viewer different images dependant upon the viewer's position in relation to the art.

In the 1950's, an artist named Yaacov Agam popularized this art form. Since then there have been numerous variations of Agam's theme including a wide variety of 3 dimensional multiple image artwork. One popular use of this art form has been in specifically constructed roadside billboards. These billboards display different messages to vehicle occupants as vehicles approach the billboard from various angles.

There are various ways artwork may be prepared such as to have the resulting image appear on pleated media in the desired manner. One way, includes taking 2 pictures of the same size (i.e., vertical and horizontal dimensions), cutting each picture into a finite number of vertical elongated segments of the same size. Thereafter, while maintaining the order of the strips to be in the same order as before each picture was segmented, interleave the strips of each picture such that the strip from the first picture is alternated between the strips of the other picture. The resulting image can be taped together then photographically reproduced directly onto plain paper which is subsequently folded into pleats. The width of each pleat corresponding to the width of each vertical segment. Alternatively, a computer user may use a commercial graphic program to manipulate two or more images in a similar manner and produce output which may also be placed on plain paper which is subsequently folded into pleats.

If one chose to use plain paper to produce the finished kinetic artwork, the creation of the folds in the paper can be a tedious manual process. Alternatively, pleated paper may be used, but pleated paper could jam a printer and would not allow many sheets to be easily placed in a feeder slot in a typical ink jet printer. Perforated paper may be used but this could also jam a printer and perforated paper also has the disadvantage of lessening the structural integrity of the paper making it easier to tear along a perforated segment.

U.S. Pat. Nos. 5,236,365 and 5,407,718 provide examples of patents which describe unique inventions that utilize special paper products to accomplish desired objectives. In U.S. Pat. No. 5,236,365 an embossed paper is used to simulate a textured surface. In U.S. Pat. No. 5,407,718 a paper product is described which permits peal-off labels to be produced via a computer printer.

SUMMARY OF THE INVENTION

It is an object of this invention to provide art paper which can be used to facilitate the production of kinetic art.

An object of this invention is to produce an art paper which can be easily flexed into a pleated form without stressing or weakening the paper.

Another object of this invention is to provide a paper surface which can be used in an ink jet, laser or xerographic printer with a resulting high print quality with minimum risk of jamming the printer.

In accordance with this invention, kinetic art images are printed or painted onto specially constructed paper. The paper is comprised of long vertical strips of equal size separated by channels which define the precise location of where folds should be made so as to form a uniform repeated pattern of pleats. The channels aid in the folding process by providing a surface which offers less resistance to forming a crease when compared to forming a crease on art paper.

In one practice of this invention where high quality artwork is being prepared the art paper is made from acid free substances to protect the finished artwork from discoloration.

In another practice of this invention when it is desirable that the media be viewable from both front and back, as would be used in a suspended display, double sided printing may be used. Still further object and advantages of my invention will become apparent from a consideration of the drawings and ensuing description.

DETAILED DESCRIPTION OF THE INVENTION

Kinetic artwork may be created in various ways. Some of these ways have been previously described in the section titled "Background of the Invention".

Figure 1:
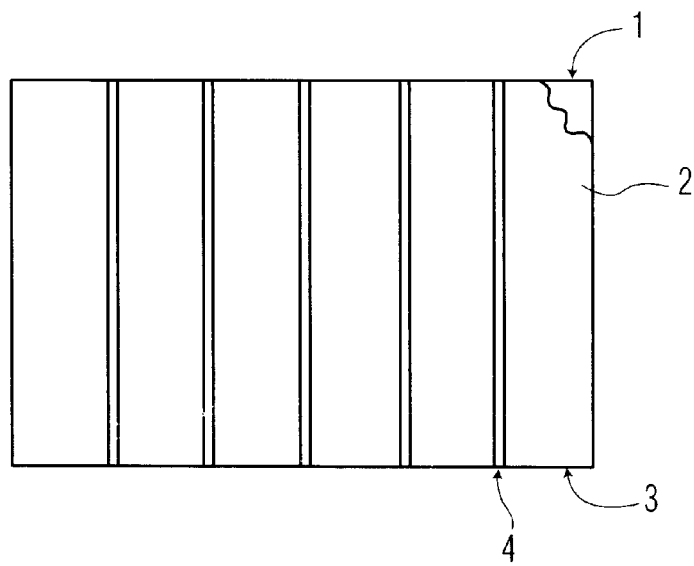
FIG. 1 is a flat view of a kinetic artwork paper consisting of a backing sheet and a white paper sheet with die cuts adhered to the backing sheet via an adhesive.

One embodiment of this invention provides an art paper which an artist may directly use to paint a kinetic image on or use in a printer. FIGS. 1–5 describe how this paper may be constructed and used. FIG. 1 is a flat view of a sheet of kinetic artwork paper consisting of a backing sheet 1 and a white paper sheet 2 which is adhered to the backing sheet via an adhesive coating. The paper sheet has a repetitive sequence pattern of die cut-outs forming large width vertical strips 3 and smaller width vertical strips which we are herein referred to as channel cutouts 4. The adhesive coating is applied to the wider strips that are vertically oriented. Next to each vertical strip 3 is a channel die cutout 4 which has no adhesive coating.

The backing sheet 1 has the following important characteristics. First it must be flexible. It should not rip easily when folded. It can be made of paper, plastic or acetate and be produced in a variety of colors. The backing sheet material must also be able to withstand the high levels of heat generated inside a commercial or personal printer. It should also exhibit a high degree of stability in terms of color fastness and flexibility under various conditions such as may exist in a normal office or home environment.

The paper which is used to form the vertical strips 3 must have the following characteristics: it should be of high quality, allowing high resolution images to be displayed properly. It should be fade resistant and have a high degree of brightness. It should also be highly opaque. If high quality artwork is being prepared the paper should be made of acid free substances.

It is noted that Synthetic papers may also be used for the base layer and/or for the vertical strips. Synthetic papers are made of a variety of polymers and are designed simulate the grain and feel of real paper while offering the tear and water resistance of plastics. The microporosity of synthetic papers assures that they print as easily as paper.

Figure 2:
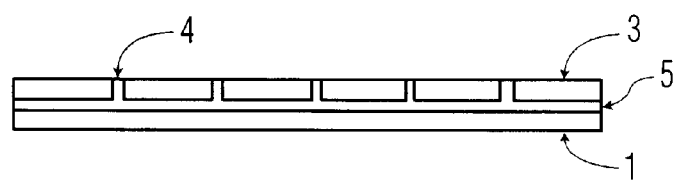
FIG. 2 is a cross sectional view of the art paper depicted in FIG. 1 but with the adhesive layer indicated and the die cut sections outlined.

FIG. 2 provides a cross sectional view of the art paper depicted in FIG. 1 but with the adhesive layer 3 indicated and the die cut-out channel sections in place.

The adhesive coating 3 preferably has four characteristics. First the adhesive should be able to withstand the heat levels generated inside a commercial or personal printer, such as a laser printer. Unless the adhesive coating is temperature stable, the adhesive will soften and ooze out from behind the paper strips if a laser printer is used. The softened adhesive could then foul the interior of the printer and could damage the printing surface of the paper strips. Consequently, the adhesive coating should be stable in the presence of temperatures up to about 200° F.

The second preferred characteristic of the adhesive is its contact adhesion quality. Once the adhesive is applied to the backing paper or backing media and the paper strips have been applied on top of the backing media the adhesive should quickly set up and permanently bind the paper strips to the backing media.

The third characteristic of the adhesive is a high degree of transparency (a.k.a. clarity). As there are spaces between adjacent paper strips the backing material will be visible when the printed image is viewed. If any adhesive lands on the space between the paper strips, it could if not transparent affect the color of the backing material on which the adhesive has inadvertently been deposited on. An artwork printed on such paper could be viewed as imperfect since all the space lines will not be of the same color.

The fourth characteristic of the adhesive is its stability over time. It should not materially change any of the required characteristics over time. These are all preferred characteristics intended to convey the best mode of practicing the invention, and are not intended to limit the scope of the claims.

The artist may create the artwork by painting images directly on the vertical strips 3 or may use a computer to compose the desired image. When using a computer program to design the artwork, the artist may place the kinetic art paper in a conventional ink jet or laser printer and after making some sizing adjustments the computer-stored image may be transferred onto the vertical strips 3 of the kinetic art paper. After the printing phase has been completed, if the channels cutouts have not been previously removed the artist may remove the channel cutouts to expose the area where the paper is to be folded.

Figure 3:
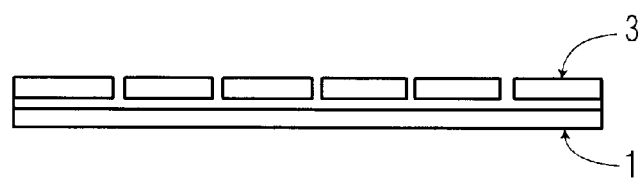
FIG. 3 is a cross section view of the art paper depicted in FIG. 1 but with the die cut sections removed.

FIG. 3 provides a cross section view of the art paper depicted in FIG. 1 but with the channel cut-out sections removed. By removing the channel cut-outs the paper may be easily folded into a series of pleats. Preferably, the width of channel cut-outs 4 may be specified by any software utilized to interleave te multiple pictures being interleaved.

Preferably, the width of the channel cut-outs and width of the vertical strips can be easily entered into the software program so that the images produced by the software program are properly printed on the vertical strips and not in the channel cutouts.

Figure 4:
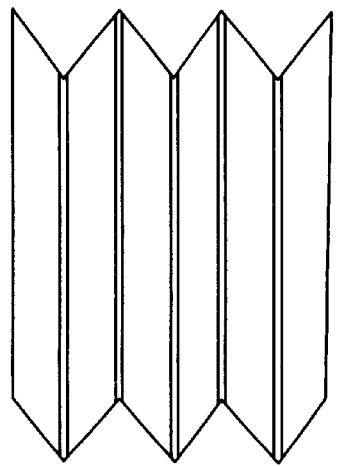
FIG. 4 provides a perspective view of the artwork paper depicted in FIG. 1 but folded into a series of pleats.

FIG. 4 provides a perspective view of the artwork paper after it has been folded into a series of pleats.

Figure 5:
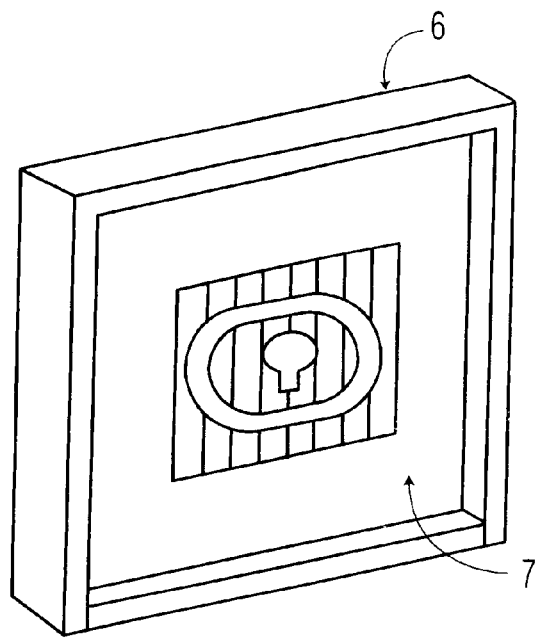
FIG. 5 is a perspective view of an image created using the techniques described herein.
Figure 6:
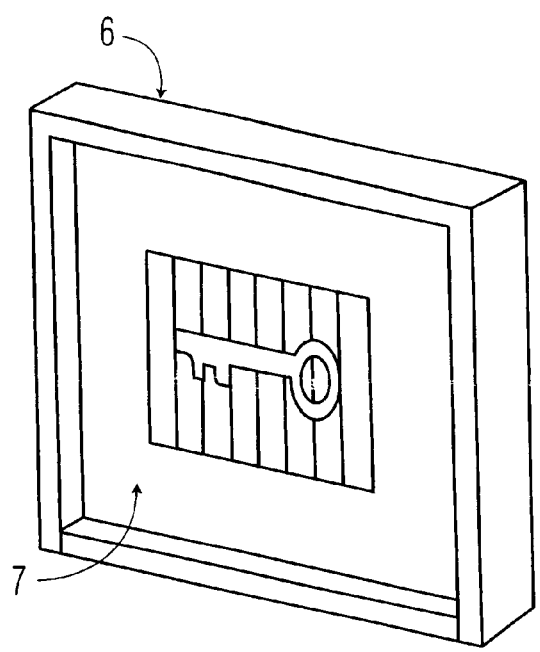
FIG. 6 is an additional perspective view of a product resulting from the techniques of the present invention.

FIGS. 5–6 provide perspective views from different viewing angles of two images incorporated onto the kinetic art work paper and mounted in a conventional picture frame 6 with a front mat cutout 7.

Figure 7:
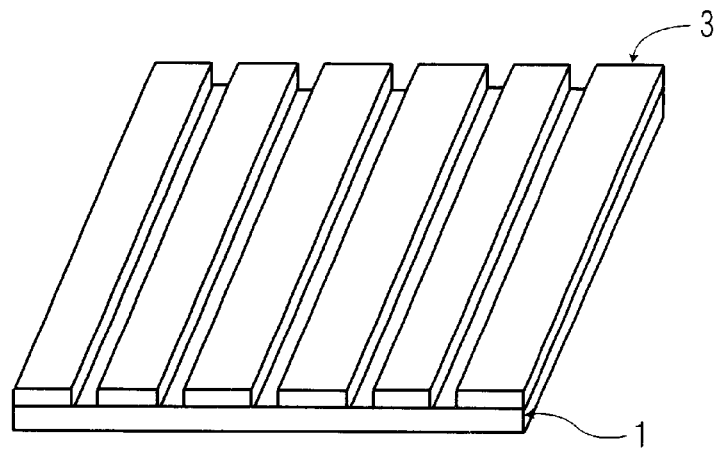
FIG. 7 is a perspective view of art paper formed by just depositing adhesive coated strips onto a backing sheet.

Another embodiment of the invention is illustrated in FIG. 7 which provides a perspective view of art paper formed by just depositing adhesive coated vertical strips onto a backing sheet. The properties of the permanent adhesive is the same as that which has been previously stated.

Figure 8:
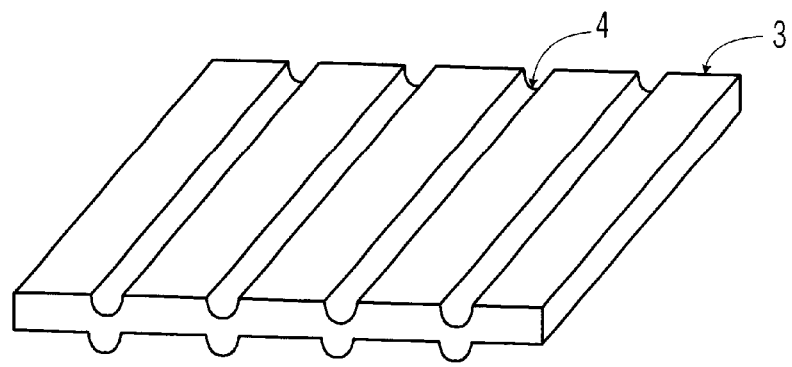
FIG. 8 is a perspective view of kinetic art paper formed by embossing a pattern of vertical strips and channels onto art paper.
Figure 9:
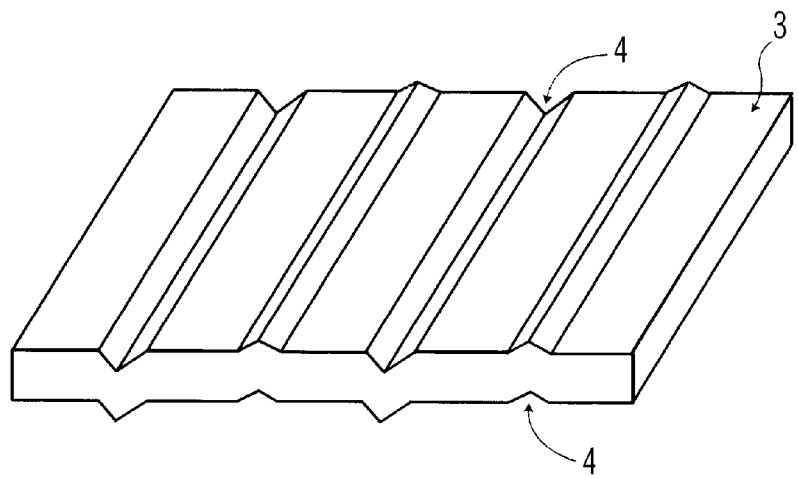
FIG. 9 is an additional embodiment formed by embossing.

A yet another embodiment of the invention is that kinetic art paper may be formed by embossing a repeating pattern of vertical strips and channels on art paper. FIGS. 8–9 are perspective views of two different versions of kinetic art paper formed by embossing two different patterns of vertical strips and channels onto art paper.

In summary, the paper may be manufactured in by a variety of techniques that facilitate the efficient folding of a constant width pleat. The art paper should also allow for ease of use with conventional laser or similar printers. Software for use with the paper should allow for an operator to easily select the height and width of each strip, the dimensions of the cut-outs between the strips, and the dimensions of the entire sheet.

While the above describes the preferred embodiment of the invention, various other enhancements will be apparent to those of skill in the art. Such variations are intended to be covered by the claims appended hereto. While my above description contains many specifies, these should not be construed as limitations on the scope of the invention, but rather as an exemplification of preferred embodiments thereof. Accordingly the scope of the invention should be determined not by the embodiment(s) illustrated, but by the appended claims and their legal equivalent.

What is claimed:

1. A structure for facilitating the creation of kinetic artwork, said structure comprising:

a base layer having a front surface and a rear surface; a plurality of parallel strips, said strips being attached permanently to said front surface, said strips being separated by a predetermined amount;

an adhesive layer coated over portions of said front surface to which said parallel strips are attached, said adhesive layer being transparent, said base layer being folded in an alternating back and forth pattern; and a second plurality of parallel strips, said second plurality of parallel strips being attached to said rear surface, and a second adhesive layer coated over portions of the rear surface of the base layer to which said second plurality of strips are attached.

2. A method of creating kinetic artwork comprising:

attaching a sheet for displaying said artwork to a base layer to form a combined structure;

peeling portions of said sheet away from said base layer such that remaining portions of said sheet form a plurality of parallel vertical strips and such that portions of said base layer previously underlying said peeled away portions form a plurality of parallel voided regions, said parallel voided regions being narrower than said vertical strips;

folding said combined structure in an alternating back and forth pattern, said folds being along said voids formed by said peeled away portions;

placing a set of two images to be displayed on said combined structure, each of said images being placed on every other fold of said back and forth pattern.

3. A method of creating a kinetic artwork paper comprising:

attaching a sheet of paper having a plurality of die cut-outs with an adhesive layer deposited on plural regions of the paper to a base layer to form a combined structure;

peeling portions of said sheet away from said base layer such that remaining portions of said sheet form a plurality of parallel vertical strips and such that portions of said base layer previously underlying said peeled away portions form a plurality of parallel voided regions, said parallel voided regions being narrower than said vertical strips.

4. The method of claim 3 wherein said base layer or said vertical stips are formed from synthetic paper.

* * * * *